United States Patent

Maric et al.

Patent Number: 5,937,565
Date of Patent: Aug. 17, 1999

[54] FLOAT WITH AUTOMATIC TRIGGERING DEVICE

[76] Inventors: Mijo Maric, Klingenberger Str. 28, D-74080 Heilbronn; Mehmed Mujagic, Suedstrasse 43/1, D-74072 Heilbronn, both of Germany

[21] Appl. No.: 08/973,990
[22] PCT Filed: Jun. 11, 1996
[86] PCT No.: PCT/DE96/01015
    § 371 Date: Mar. 2, 1998
    § 102(e) Date: Mar. 2, 1998
[87] PCT Pub. No.: WO97/00009
    PCT Pub. Date: Jan. 3, 1997

[30] Foreign Application Priority Data

Jun. 14, 1995 [DE] Germany ............ 195 21 664

[51] Int. Cl.⁶ ................ A01K 97/12; A01K 91/00
[52] U.S. Cl. ........................... 43/15; 43/44.91
[58] Field of Search ............. 43/44.9, 44.91, 43/17, 17.5, 15, 16

[56] References Cited

U.S. PATENT DOCUMENTS

| | | | |
|---|---|---|---|
| 3,618,251 | 11/1971 | Hodshire | 43/15 |
| 3,660,922 | 5/1972 | Chill | 43/15 |
| 3,672,087 | 6/1972 | Milburn, Jr. | 43/44.88 |
| 3,702,512 | 11/1972 | Hodshire | 43/15 |
| 3,766,679 | 10/1973 | Noe | 43/15 |
| 3,766,680 | 10/1973 | Torme et al. | 43/15 |
| 3,771,250 | 11/1973 | Helmke | 43/15 |
| 3,823,501 | 7/1974 | Bybee | 43/15 |
| 3,852,905 | 12/1974 | Webb | 43/15 |

(List continued on next page.)

FOREIGN PATENT DOCUMENTS

| | | | |
|---|---|---|---|
| 738668 | 7/1966 | Canada | 43/16 |
| 962304 | 6/1950 | France | 43/16 |
| 1255431 | 12/1961 | France | 43/16 |
| 1257292 | 12/1961 | France | 43/16 |
| 2029620 | 12/1971 | Germany . | |
| 2245642 | 3/1974 | Germany . | |
| 7824353 | 11/1978 | Germany . | |
| 579540 | 7/1958 | Italy | 43/16 |
| 624542 | 9/1961 | Italy | 43/16 |
| 683543 | 2/1965 | Italy | 43/16 |
| 2252226 | 8/1992 | United Kingdom | 43/16 |
| 8697 | 5/1996 | United Kingdom | 43/16 |

*Primary Examiner*—Thomas Price
*Assistant Examiner*—Fredrick T. French, III
*Attorney, Agent, or Firm*—Paul Vincent

[57] ABSTRACT

A float (10) having an automatic triggering device for a fishing apparatus includes an inner sleeve (13) which can be inserted into a float housing (11) in a direction of the longitudinal axis of the float housing (11) in opposition to the force of tensioning spring (14) and is held by means of a spring catch (15) in the inserted state. The spring catch (15) can be locked in this position by means of a contact lever (21). The locking can be released through deflection of the contact lever (21) in the direction of the longitudinal axis of the float housing (11). A fishing line (23) is passed through the inner sleeve (13) and is connected to a driver element (25, 26), disposed above the inner sleeve (13) in such a fashion that the inner sleeve (13), during motion out of the inserted locked state into the initial state, pulls along, with the assistance of the driver element (25, 26), the fishing line (23) as well as a fishing hook (28) connected to the fishing line (23). The spring catch (15) and the contact lever (21) have oppositely lying rotational axes (20, 22) mounted on the float housing (11). One end of the contact lever (21) seats on an inner side of the spring catch (15) to lock the spring catch (15) in the inserted state of the inner sleeve (13). The fishing line (23) has an enlargement (24) which presses directly on and deflects the contact lever (21) when the fishing hook (28) is pulled. In this manner, the automatic triggering device of the float is protected against unintentional triggering during casting and in the event of large surface waves while exhibiting a rapid and sensitive response.

10 Claims, 2 Drawing Sheets

U.S. PATENT DOCUMENTS

| | | | |
|---|---|---|---|
| 4,011,679 | 3/1977 | Smith | 43/15 |
| 4,121,367 | 10/1978 | Gonnello | 43/16 |
| 4,124,948 | 11/1978 | Mautner | 43/15 |
| 4,359,836 | 11/1982 | Yuji | 43/44.9 |
| 4,398,368 | 8/1983 | Nishi | 43/15 |
| 4,449,318 | 5/1984 | Lane | 43/44.9 |
| 4,547,990 | 10/1985 | Hero | 43/15 |
| 4,635,392 | 1/1987 | Wirkus | 43/44.9 |
| 4,696,125 | 9/1987 | Rayburn | 43/43.14 |
| 4,944,106 | 7/1990 | Wu et al. | 43/15 |
| 5,033,222 | 7/1991 | Chang | 43/16 |
| 5,170,581 | 12/1992 | Lyons | 43/43.12 |

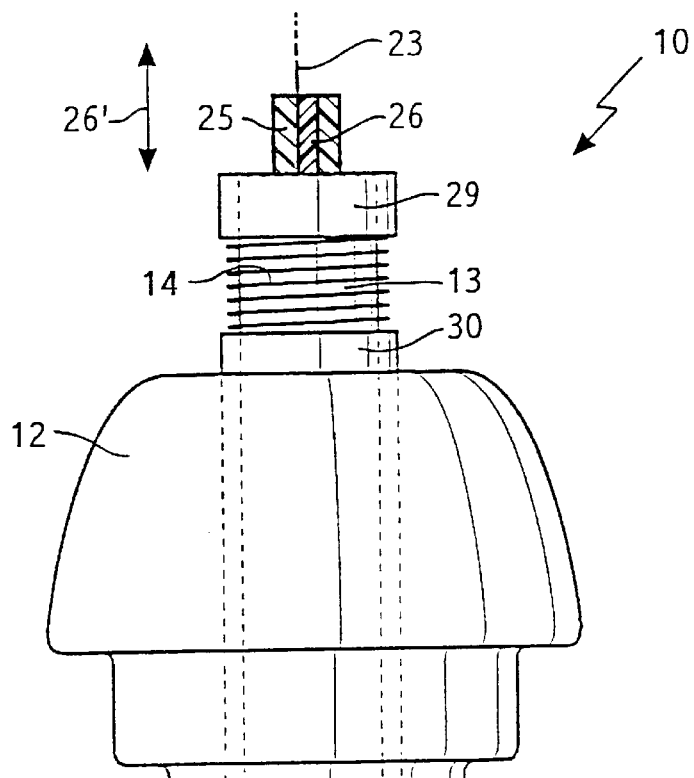
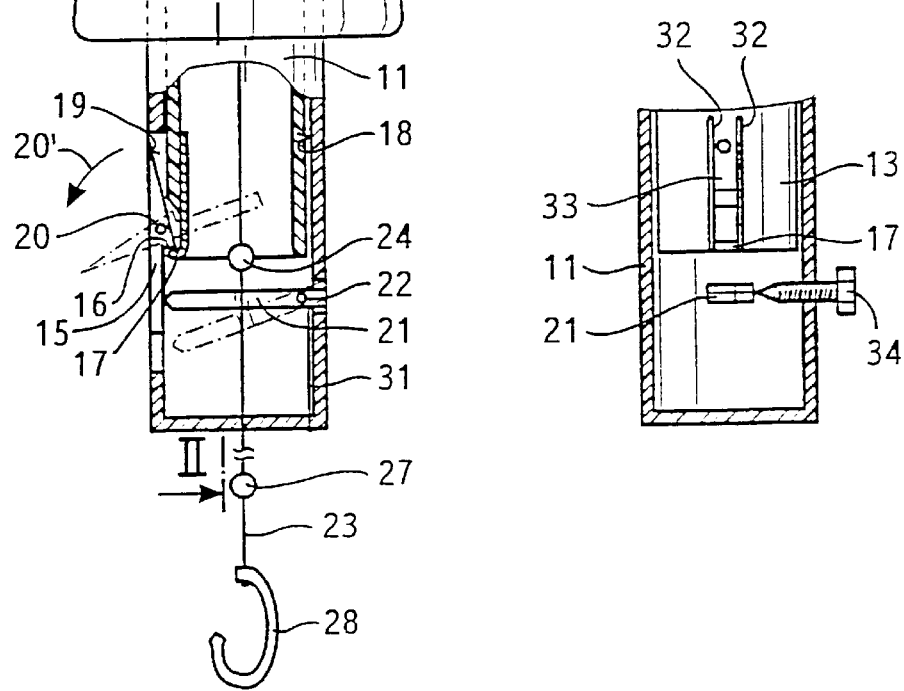

FLOAT WITH AUTOMATIC TRIGGERING DEVICE

BACKGROUND OF THE INVENTION

The present invention concerns a float with an automatic triggering device for a fishing apparatus having an inner sleeve which can be inserted into a float housing in the direction of the longitudinal axis of the float housing in opposition to the pressure of a tensioning spring and which is held in the inserted state by a detent pawl mounted for rotation to the float housing, wherein the detent pawl can be locked in this position by a contact lever mounted via a rotation axis to the float housing and the locking can be released through deflection of the contact lever in a direction of the longitudinal axis of the float housing, wherein a fishing line is fed through the inner sleeve and connected to a driver element, disposed above the inner sleeve, in such a fashion that the inner sleeve, during motion out of the inserted locked position into the original position and with the assistance of the driver element, pulls along the fishing line and a fishing hook attached to the fishing line.

A float of this kind is known in the art from DE-GM 78 24 353.

Fishing devices are utilized for competitive and recreational fishing which have a float connected to the fishing line disposed on the surface of the water. A fish biting the bait disposed on the fishing hook pulls the fishing hook and therefore the fishing line in a downward direction so that the diving motion of the float signals the fisherman that a fish has bitten. In order to be able to safely remove the fish from the water, the end of the fishing line must be pulled which can be effected by shortening the fishing line, i.e. by a jerked retraction of the fishing line. In conventional fishing devices the fisherman himself must assure that the jerked retraction of the fishing line occurs at that instant when the fish bites the bait.

The conventional float therefore has an automatic triggering device which effects an automatic jerked retraction of the fishing line after the fish bites on the bait. This is achieved in the conventional float by a spring sleeve insertable into a housing in opposition to the pressure of a tensioning spring and held by a detent pawl.

When a fish bites, the fishing line is pulled downwardly by the fishing hook so that a first driver element connected to the fishing line moves a contact sleeve, displaceable within the spring sleeve, against the contact lever and the dentent pawl frees a shoulder on the spring sleeve to release the locking. The contact lever must thereby be moved against a compression spring. After release, the spring sleeve moves, by means of the spring force of the tensioning spring, in the upward direction out of the float housing and likewise moves, by means of a second driver element, the contact housing out of the float housing so that the fishing line is also pulled in an upward direction via the first driver element to effect jerked retraction of the fishing line.

Disadvantageously, the pulling by the fish on the fishing line does not directly act on the automatic triggering mechanism. Movement of the fishing hook initially results in a displacement of the contact sleeve to bring the contact lever into a triggering position. Since the contact sleeve is guided within the spring sleeve, motion of the contact sleeve requires overcoming a non-negligible amount of friction. The frictional force to be overcome is increased even more by the fact that the float is located in water and is subject to soiling.

There is the additional disadvantage that the detent pawl has a right-angled shape, has a pivot axis in the middle of the two perpendicular legs, and the end of one of the legs seats in the vicinity of the pivot axis of the contact lever. A large deflection of the contact lever against a compression spring is therefore necessary to unlock the detent pawl for release of the spring sleeve.

Since the pulling force on the fishing hook is transferred via the spring bushing onto the contact bushing and then via the contact bushing onto the fishing hook, an indirect pulling action for retracting the fishing line is effected having reduced pulling force. The pulling force acting on the fishing hook is reduced to a further extent, since the spring and contact sleeves of the conventional float are located in water during use, are movable with respect to each other, and are therefore subject to frictional forces and soiling.

There is the additional disadvantage that the triggering mechanism of the conventional float allows for no adjustment of play for deflection of the fishing hook by the fish so that the triggering mechanism does not respond immediately when the fishing hook is pulled.

In addition, the triggering force of the triggering mechanism of the conventional float cannot be adjusted which would be advantageous for fish of different sizes.

SUMMARY OF THE INVENTION

It is therefore the underlying purpose of the present invention to further improve the conventional float in such a fashion that the automatic triggering mechanism of the float is protected against unintentional release during casting and in the presence of large waves on the water surface while nevertheless having a rapid and sensitive response.

This purpose is achieved in accordance with the invention in that an end of the contact lever locks the detent pawl in the inserted state of the inner sleeve at an inner side of the dentent pawl lying across from the rotation axis of the contact lever, and the fishing line has an enlargement which, when pulling on the fishing hook, directly presses onto the contact lever to deflect same.

Pulling on the fishing hook causes the enlargement to be pressed against the contact lever to move same downwardly in an axial direction so that the fishing line acts directly on the contact lever. For this reason, a sudden and rapid response is achieved for the triggering mechanism.

Since only a small number of components having low mutual friction are necessary to effect this triggering mechanism, the functioning of the float in accordance with the invention is advantageously less sensitive to soiling. Since the pulling on the fishing line acts directly on the contact lever, an efficiency without frictional losses can be achieved which is higher than that of the conventional float.

It is advantageous when, for release of the automatic triggering mechanism of the present invention, only the fishing line must be moved, same having an enlargement for cooperation with the contact lever. In a particularly preferred embodiment of the present invention, the enlargement of the fishing line is formed by a ball attached to the fishing line. The enlargement is thereby easy to manufacture. The ball can also be a lead ball to stiffly hold the fishing line within the float housing.

When the tensioning spring is slid over the inner sleeve and is compressible between a peripheral protrusion disposed at the upper end of the inner sleeve and the upper end of the float housing, a tensioning spring having reduced spring force can be easily replaced if necessary, since it is located outside of the float housing. This is also advantageous for cleaning the float in accordance with the invention.

Since the tensioning spring is disposed above the float housing, it is located above the surface of the water during use and expand in the triggered state without resistance by the water.

A pretensioning of the contact lever can be easily achieved to return the contact lever back into its initial horizontal position when a rubber band is attached at one end to the borne end of the contact lever and at the other end, in the axial direction, to the lower end of the float housing.

In an additional preferred embodiment of the present invention, an adjustment screw is provided for adjustment of the triggering force of the contact lever. This has the advantage that the triggering force of the triggering mechanism can be set to differing strengths and therefore adjusted to the waves, the casting distance, the size of the fish and the diving depth in the water.

In another embodiment of the present invention, a resilient outwardly protruding shoulder is formed on the lower end of the inner sleeve for engagement with the detent pawl, wherein the inner sleeve has openings on each side of the shoulder. The sideward openings in the inner sleeve provide resiliency so that the shoulder, when inserting the inner sleeve, can seat on an inner wall of the float housing and guide along the inner housing wall up to the detent pawl. The shoulder of the inner sleeve thereby advantageously snaps on the detent pawl in a simple and secure fashion. The openings provide a tab on the inner sleeve at which the shoulder is disposed. The protruding tab allows the shoulder to securely and safely engage the detent pawl.

In an additional embodiment, the driver element consists essentially of two mutually insertable parts between which the fishing line is held. Since the fishing line is held in the driver element by means of frictional engagement, the separation between the driving element and the enlargement can be adjusted by overcoming this frictional force. When the driver element is securely held, the fishing line can be pulled through the driver element. This adjustment allows for adjustment of the separation between the enlargement and the contact lever. When the fishing hook is slowly pulled (and therefore also the fishing line), the fishing line overcomes the frictional force and slides along the parts of the driver element until the enlargement triggers the contact lever. It is thereby possible to adjust the degree to which the fishing line or the fishing hook must be deflected until the automatic triggering mechanism is activated. When the automatic triggering mechanism activates and the inner sleeve is moved in the upward direction, the frictional force is sufficient to jerk back the fishing line in the upward direction.

When the lower end of the inner sleeve which can be inserted into the float housing has a catch element borne on the inner sleeve which, in the triggered and pulled-apart state of the inner sleeve and the float housing, engages a shoulder in an opening in the float housing, one can prevent the float from disassociating into its individual components during this jerking motion of the automatic triggering mechanism.

The float can be advantageously produced from plastic so that the float has low weight and safely floats on the surface of the water.

Further advantages can be derived from the description of the accompanying drawing. The above mentioned features and those to be further described below can each be utilized in accordance with the invention individually or collectively in arbitrary combination. The embodiments mentioned are not to be considered as exhaustive enumeration, rather have exemplary character only.

BRIEF DESCRIPTION OF THE DRAWING

The invention is represented in the drawing and will be further explained in relation to embodiments.

DESCRIPTION OF THE PREFERRED EMBODIMENTS

Figure 3:
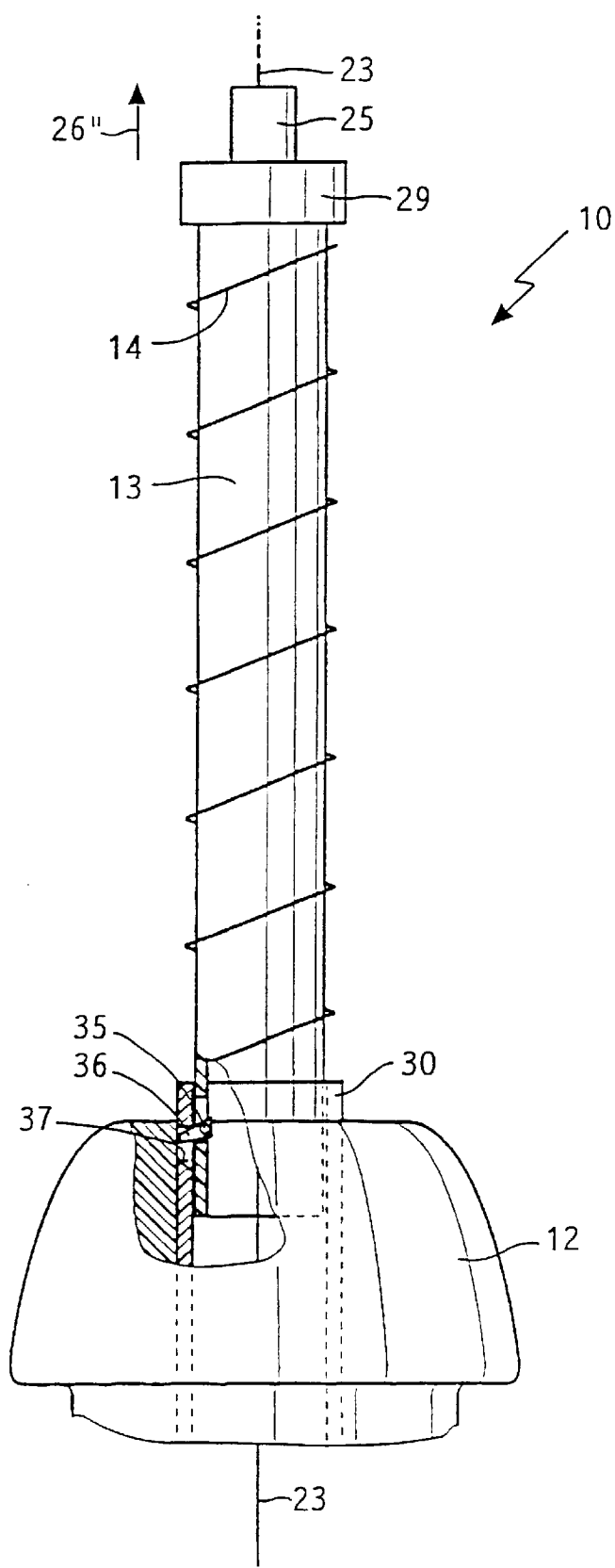

FIG. 1 shows a longitudinal cut through portions of a float in accordance with the invention;

FIG. 2 shows a cut along the line II—II of FIG. 1 and

FIG. 3 shows a triggered state with separated displaced inner sleeve and float housing.

The figures of the drawing show the object in accordance with the invention in a highly schematic fashion and are not to be taken to scale. The features are shown in the individual drawings in such a manner that their structure can be clearly seen.

FIG. 1 shows a longitudinal cut through a float 10 having a float housing 11 connected to a balloon-like float body 12 to hold float 10 on the surface of the water during fishing. An inner sleeve 13 is inserted into the float housing 11 in opposition to the pressure of a tensioning spring 14. In the inserted position, the inner sleeve 13 is held by means of a dentent pawl 15 and a shoulder 17 of the inner sleeve 13 which engages a catch nose 16 of the dentent pawl 15. The shoulder 17 is formed on the inner sleeve 13 and protrudes in a radial direction in a resilient manner. When the inner sleeve 13 is introduced into the float housing 11, the shoulder 17 slides on the inner wall 18 of the float housing 11 along an abutment ramp 19 of the detent pawl 15 and subsequently engages the catch nose 16 of the detent pawl 15. In the position shown in the figure, the detent pawl 15, which is borne in a pivotable manner about the rotation axis 20, is locked by the contact lever 21 whose end seats on an inner side of the detent pawl 15. The contact lever 21 is likewise pivotable about a rotational axis 22 and has a through-hole in its middle through which a fishing line 23 passes. The dot-dashed lines of the figure show the pivotable positions of the dentent pawl 15 and the contact lever 21.

The fishing line 23 is passed through the float housing 11 and the inner sleeve 13. The fishing line 23 has an enlargement 24 which can have varied separations from the contact lever 21. The separation between the enlargement 24 and the contact lever 21 can be adjusted via a driver element, since the seating of the driver element on the float housing determines the length of the fishing line 23 which is fed through the float 10. The fishing line 23 is clamped between the first portion 25 and a second portion 26 of the driver element. The fishing line can be pulled through the first portion 25 and the second portion 26 of the driver element in the direction of arrow 26' by overcoming a frictional force.

A lead weight 27 and a fishing hook 28 keep the fishing line 23 taught. When the fishing hook 28 is pulled downwardly in the axial direction, the fishing line 23 slides between the first and the second parts 25 and 26 of the driver element, overcoming the frictional force, in a downward direction and the enlargement 24 comes in contact with the contact lever 21. When the fishing line is pulled further in the downward direction, the enlargement 24 deflects the contact lever 21 into the dot-dashed position. This dot-dashed position of the contact lever 21 releases the detent pawl 15 so that the dentent pawl 15 deflects about the rotational axis 20 in the rotational direction 20' due to the spring action of the tensioning spring 14.

Due to the tensioning force of the tensioning spring 14, the inner sleeve 13 is moved in the upward direction and carries, due to its rapid motion, the driver element and the fishing line 23 in a jerked manner along with it in the upward direction. This causes the fishing hook 28 to also be jerked back.

A fish, biting at this time on bait located on the fishing hook 28, is caught by the activation mechanism of the float 10.

After triggering, the inner sleeve 13 can once more be inserted into the float housing 11 of the float 10 in opposition to the force of the tensioning spring 14. In the inserted state, the tensioning spring 14 is prebiased between a peripheral protrusion 29 of the inner sleeve 13 and an upper end 30 of the float housing 11. A rubber band 31 causes the contact lever 21 to return to its horizontal position after triggering.

FIG. 2 shows a cut along line II—II through the float 10. The inner sleeve 13 has openings 32 which form a tab 33 on which the shoulder 17 is disposed. The tensile force required for deflecting the contact lever 21 can be adjusted by means of an adjustment screw 34.

FIG. 3 shows a side view of the float 10 in the separated, triggered state. The inner sleeve 13 is shown pushed out of the float housing 11, in an upward direction. The tensioning spring 14 is therefore largely relaxed between the upper end 30 of the float housing 11 and a peripheral protrusion 29 of the inner sleeve 13. By means of the parts of the driver element, of which only the first part 25 is visible in the figure, the fishing line 23 is pulled along therewith in the upward direction of arrow 26". A catch element 36, pivotable about a pivot axis 35, is visible in a cut-open partial section of the float 10. The catch element 36 prevents an unintentional springing of the inner sleeve 13 out of the float housing 11. The catch element 36 engages an edge of an opening in the float housing 11. When the inner sleeve 13 is inserted into the float housing 11, the catch element 36 is folded over in an inward direction by the diagonal slanted surface 37 of the opening of the float housing 11 to facilitate insertion.

We claim:

1. A float with automatic triggering device for retracting a fishing hook attached to a fishing line when a fish bites bait located on the fishing hook, the float comprising:

a housing having a longitudinal axis, the housing also having a detent pawl mounted for rotation relative to the housing and a contact lever mounted at a first end via a rotation axis to said housing and seating at a second end on an inner side of said detent pawl in a locking position;

a sleeve inserted within said housing to move substantially parallel to said longitudinal axis, said sleeve having a securing element disposed at an upper end thereof, said sleeve and said securing element for passing the fishing line through said sleeve and for connecting the fishing line to said securing element, said sleeve held in said locking position through engagement with said detent pawl;

a spring cooperating between said sleeve and said housing to urge said sleeve in an upward direction relative to said housing into an unlocked position; and an enlargement mounted to the fishing line and directly engaging said contact lever for deflecting said contact lever away from said inner side of said detent pawl in a direction of said longitudinal axis, whereby said sleeve is released from said locking position to move vertically relative to said housing and carry the fishing line along with it after the fish pulls on the fishing hook.

2. The float of claim 1, wherein the enlargement is a ball formed on the fishing line.

3. The float of claim 1, wherein said sleeve has a peripheral protrusion disposed on an upper end of said sleeve, and said spring is disposed over said sleeve for compression between said peripheral protrusion and an upper end of said housing.

4. The float of claim 1, further comprising an elastic band attached between an end of the contact lever and a lower end of said housing for urging said one end of said contact lever towards said inner side of said detent pawl.

5. The float of claim 1, further comprising an adjustment screw mounted to said housing and communicating with said contact lever for adjusting a triggering force of said contact lever.

6. The float of claim 1, wherein said sleeve comprises a resilient outwardly protruding shoulder formed on a lower end thereof for engagement with said detent pawl in said locking position.

7. The float of claim 6, wherein said sleeve has openings at sides of said shoulder.

8. The float of claim 1, wherein said securing element comprises two mutually insertable parts between which the fishing line is held.

9. The float of claim 1, wherein said sleeve comprises a catch element disposed at a lower end of said sleeve and wherein said housing has an opening for engagement with said catch element in said unlocked position.

10. The float of claim 1, wherein the float is made from plastic.

* * * * *